United States Patent [19]

Grabel

[11] Patent Number: 4,591,997
[45] Date of Patent: May 27, 1986

[54] METHOD OF STORING AND PRINTING IMAGE WITH NON-REENTRANT BASIC DISK OPERATING SYSTEM

[75] Inventor: Vernon Grabel, Cotuit, Mass.

[73] Assignee: Polaroid Corporation, Cambridge, Mass.

[21] Appl. No.: 555,832

[22] Filed: Nov. 28, 1983

[51] Int. Cl.⁴ .......................... G06K 3/00; G06F 15/40
[52] U.S. Cl. .................................. 364/519; 358/280; 358/296; 364/518
[58] Field of Search ............... 364/514, 518, 519, 523; 358/280, 287, 903, 296

[56] References Cited

U.S. PATENT DOCUMENTS

| | | | |
|---|---|---|---|
| 4,180,857 | 12/1979 | Yoshihara et al. | 364/519 X |
| 4,303,948 | 12/1981 | Arai et al. | 358/287 |
| 4,345,276 | 8/1982 | Colomb | 358/903 X |
| 4,472,736 | 9/1984 | Ushio et al. | 358/280 X |
| 4,511,928 | 4/1985 | Colomb | 364/519 X |
| 4,545,068 | 10/1985 | Tabata et al. | 358/903 X |

OTHER PUBLICATIONS

Ward: Memory Access Technique, IBM Technical Disclosure Bulletin, vol. 21, No. 3, Aug. 1978, pp. 992-994.

Primary Examiner—Felix D. Gruber
Attorney, Agent, or Firm—Edward S. Roman

[57] ABSTRACT

A method for storing and printing an image utilizing a computer graphics system of the type having a non-reentrant operating system wherein bit mapped image data may be transferred to an external permanent memory storage medium from which the bit mapped image data may be subsequently recalled for printing into a hard copy.

6 Claims, 9 Drawing Figures

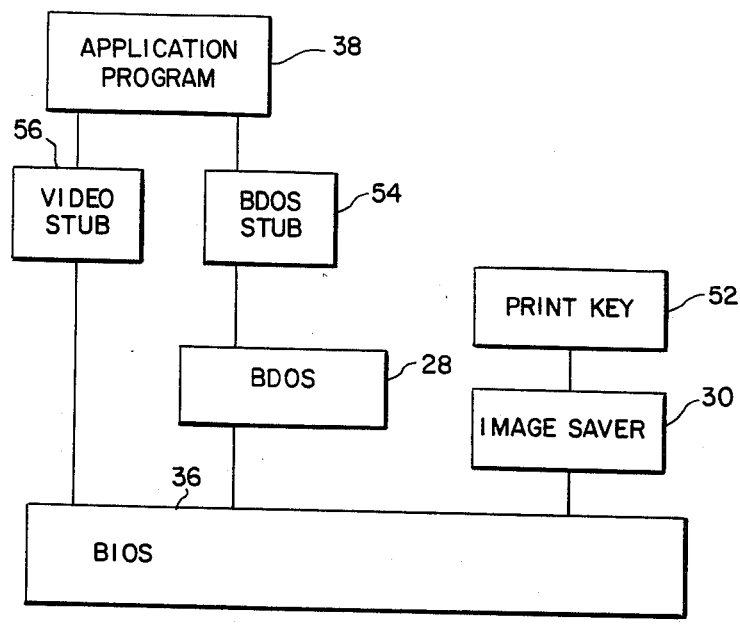
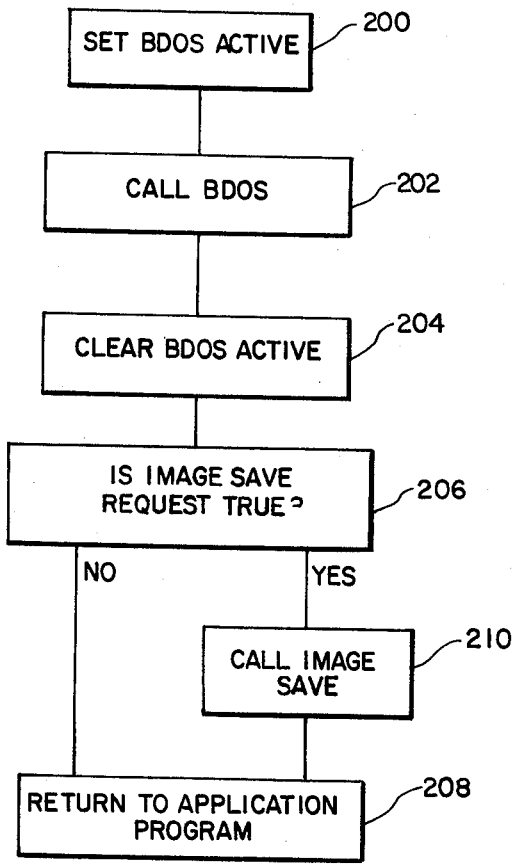
FIG. 4
FIG. 5

METHOD OF STORING AND PRINTING IMAGE WITH NON-REENTRANT BASIC DISK OPERATING SYSTEM

BACKGROUND OF THE INVENTION

1. Field of the Invention

This invention relates generally to a method for storing and printing an image with computer graphics apparatus and, more specifically, to a method for storing and printing an image utilizing computer graphics apparatus of the type having a non-reentrant operating system.

2. Description of the Prior Art

Computer graphics apparatus of a type with which the user may create a variety of images such as bar graphs, charts, etc. depending upon the particular applications program utilized are well known in the art. Such computer graphics apparatus are generally utilized in combination with a number of different peripheral devices such as an input keyboard, a video display terminal for viewing the images created and a printer to provide a hard copy of the image created by the user and displayed on the video display terminal. A variety of printers such as ink jet, thermal or photographic may be utilized in a well-known manner to provide the hard copy of the image displayed by the video display terminal upon the depression of an appropriate image saving request key on the keyboard. Since the image selected to be printed and displayed by the video display terminal is ordinarily stored in a random access memory, the applications program must provide for the printer to immediately provide the hard copy upon the print request by the user since the printer utilizes the bit mapped image data stored at that instant in the random access memory in order to make the hard copy. However, as a result of the long operating times for some printers to provide a hard copy, it may be preferable to transfer the bit mapped image data from the random access memory to an external storage medium such as a floppy disk in which the bit mapped image data may be saved for subsequent printing into a hard copy at the termination of the applications program.

For computer graphics systems of the type which utilize an operating system which is generally characterized as being non-reentrant, it is not possible to interrupt the operating system to immediately transfer bit mapped image data from the random access memory to the floppy disk. Therefore, the user is unable to make a hard copy with the printer after the termination of the applications program since the bit mapped image data which defines the image to be printed cannot be stored on the floppy disk.

Therefore, it is a primary object of this invention to provide a method for storing and printing an image utilizing a computer graphics system of the type having a non-reentrant operating system wherein bit mapped image data may be transferred to an external permanent memory storage medium from which the bit mapped image data may be subsequently recalled for printing into a hard copy.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A method for storing and printing an image utilizing computer graphics apparatus of the type having a non-reentrant operating system comprises the following steps. A computer graphics apparatus is first requested to save bit mapped image data for a selected image on an external data storage medium. A determination is then made as to whether the operating system is active and further action is withheld pursuant to the image save request if the operating system is in fact determined to be active. Next, a determination is made at the end of each period in which the operating system is active as to whether an image save request was made during that period of operating system activity. The bit mapped image data is then saved in the external storage medium either immediately in response to the image save request upon the determination that the operating system is not active or after the termination of operating system activity in response to the determination that the image save request was made during a period of operating system activity. Once the bit mapped image data is saved on the external storage medium, it is thereafter recalled by a printing device to provide a hard copy of the image saved.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 4 is a block diagram for a basic system software organization of the computer graphics apparatus of this invention;

FIG. 5 is a functional flow diagram for one block of FIG. 4;

DESCRIPTION OF THE PREFERRED EMBODIMENT

Figure 1:
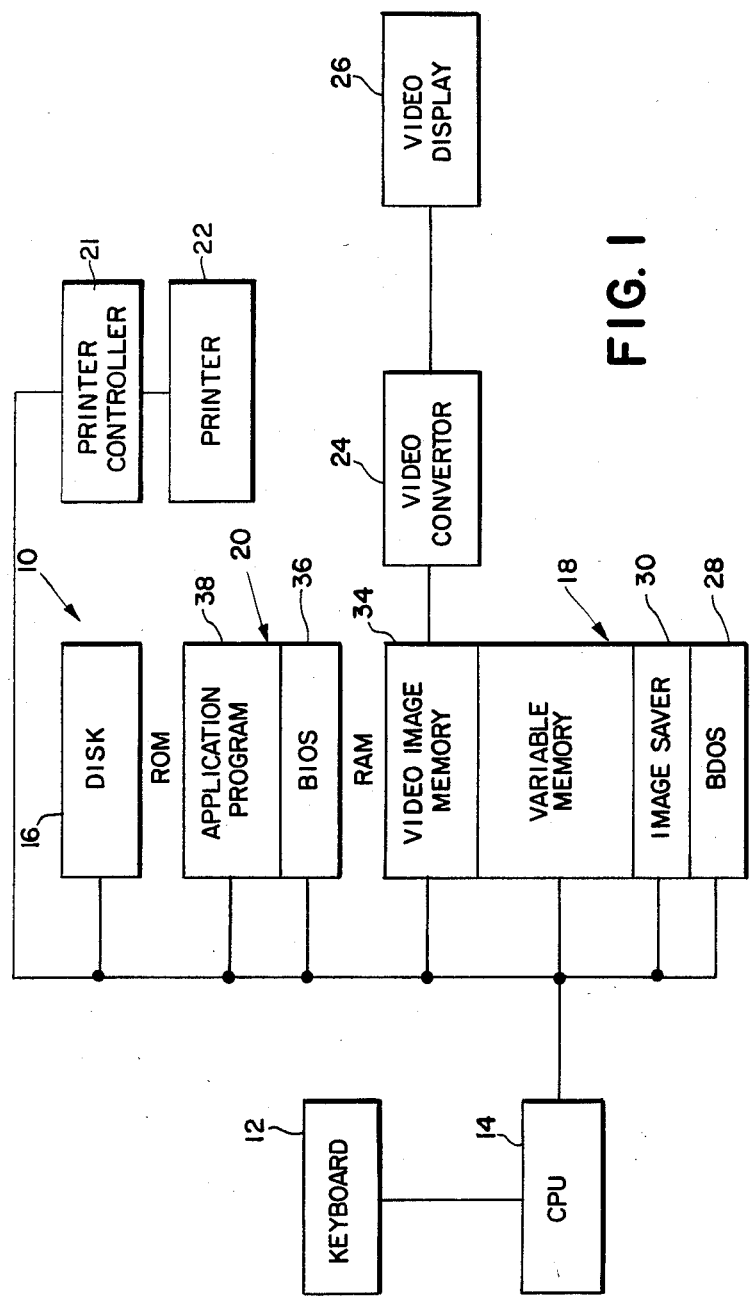
FIG. 1 is a block diagram for a computer graphics system on which the method of this invention may be practiced.

Referring now to FIG. 1, there is shown a system in which an image created by an application program may be saved and subsequently printed in the manner of this invention to be subsequently described. The system comprises a computer as shown generally at 10 including an input terminal such as a keyboard 12, a central processing unit 14, and a computer memory which may comprise an external storage medium such as a floppy disk 16, an internal read only memory (ROM) 20 and an internal random access memory (RAM) 18. An output signal from the random access memory (RAM) 18 may be directed to a video converter 24 which, in turn, provides an output signal to a video display 26. The CPU 14 can control the operation of a printer 22 through a printer controller 21 in a manner as is well known in the art. The printer 22 may be of any conventional type such as ink jet, thermal or photographic and may also derive an input signal from the floppy disk 16 to provide a hard copy in the manner of this invention to be subsequently described.

Figure 3:
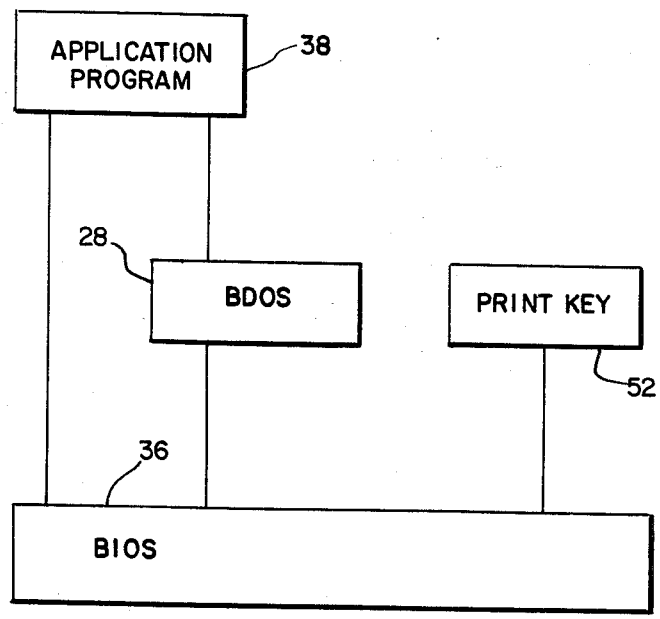
FIG. 3 is a block diagram for the basic system software organization of a conventional computer graphics apparatus.

Referring now to FIG. 3, there is shown in block diagram for a conventional basic system software organization for the computer 10 comprising an application program 38 which may be initially inputted to the computer 10 by way of the floppy disk 16 as shown in FIG. 1. The application program 38 interacts with an operating system comprising a basic disk operating system (BDOS) 28 and a basic input/output system (BIOS) 36 both of which are in computer memory. The basic disk operating system (BDOS) 28 is illustrated in FIG. 1 as residing in the random access memory (RAM) 18 although it could also reside in the read only memory (ROM) 20 while the basic input/output system (BIOS) 36 is illustrated as residing in the read only memory (ROM) 20 although it could also reside in the random access memory (RAM) 18. The basic input/output system (BIOS) 36 is primarily hardware dependent and operates in a well-known manner to provide the direct functional interraction with the various input/output devices such as the keyboard 12, printer 22, and video display 26.

The keyboard 12 may also include a print key through which a print key request as shown at 52 may be provided to the basic input/output system (BIOS) 36 to activate the printer 22 to provide a hard copy of the image displayed by the video display 26. Although the print key request 52 is shown and described, it will be equally apparent that for keyboards that do not have a specific print key, a predetermined order of keys may be depressed to accomplish the same function as the print key request 52. Thus, the operator by depressing the print key to provide the print key request 52 can activate the printer 22 to provide an immediate hard copy of the image as shown by the video display 26 and as defined by the image data stored in a video image memory 34 in the random access memory (RAM) 18 of FIG. 1.

The basic disk operating system (BDOS) 28 is preferably of a type which is generally characterized as being non-reentrant such as those sold under the tradename Control Program Monitor (CP/M) by Digital Research and Microsoft Disk Operating System sold by Microsoft. Such non-reentrant basic disk operating systems (BDOS) are suitable for use in computers such as the IBM PC, IBM XT, DEC Rainbow, T.I. Professional and like computers. Therefore, although a hard copy of the image displayed by the video display 26 may be provided immediately by the printer 22 upon the depression of the print key to provide the print key request 52 since only the basic input/output system (BIOS) 36 is utilized, it is not possible to interrupt the basic disk operating system (BDOS) 28 to transfer bit mapped image data from the video image memory 34 to the disk 16 in order to enable a hard copy to be made after the termination of the applications program 38 by the printer 22 recalling the bit mapped image data stored by the disk 16.

Figure 6:
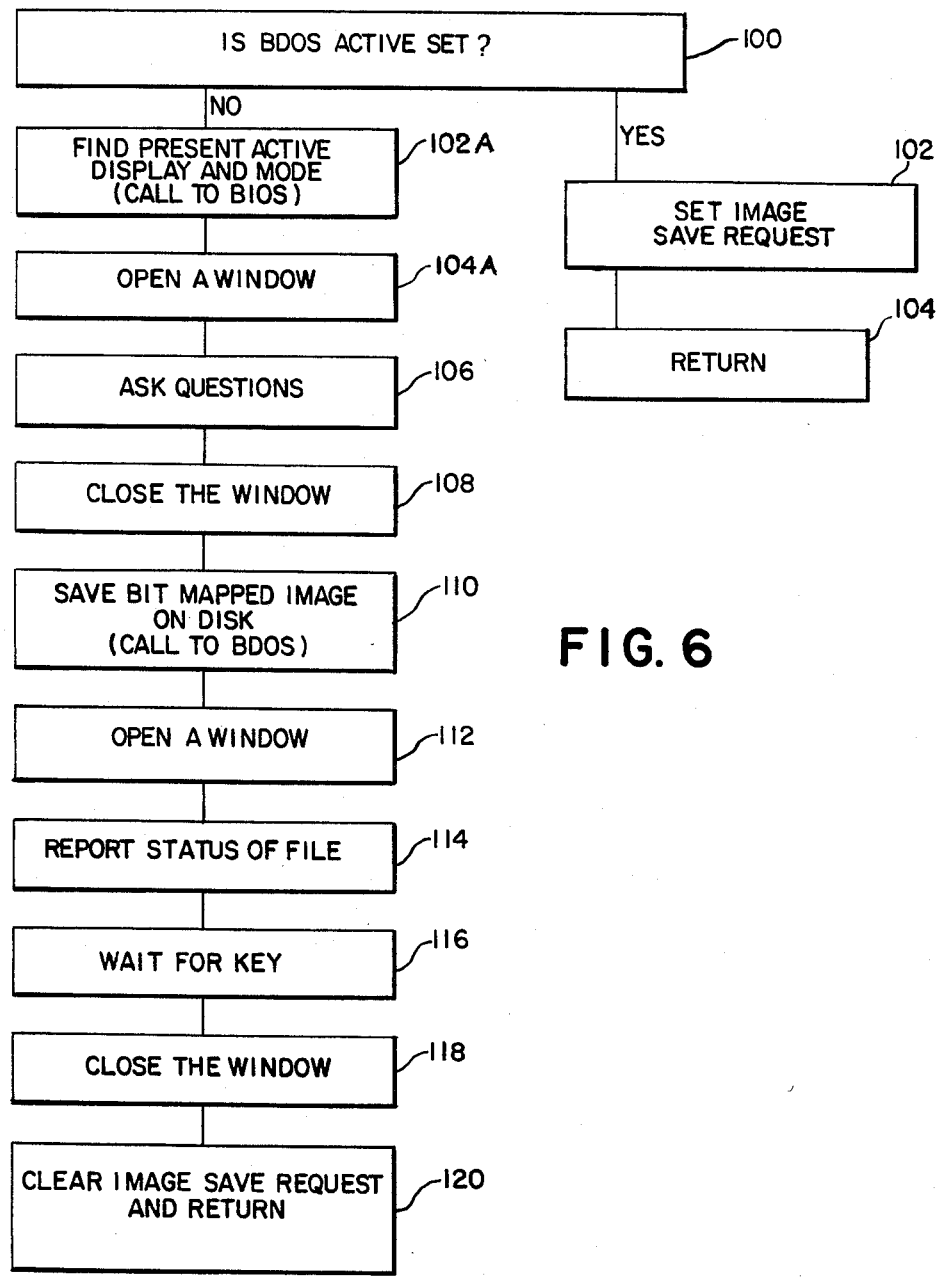
FIG. 6 is a functional flow diagram for another block of FIG. 4.

Referring now to FIG. 4, there is shown a basic system software organization for the computer system 10 of FIG. 1 incorporating the image saving routine of this invention as shown at 30. In conjunction with the image saving routine 30, there is also provided a basic disk operating system (BDOS) stub as shown at 54 and a video stub as shown at 56. Referring now to FIG. 6, there is shown a functional flow diagram for the image saving routine 30 of this invention which operates in the following manner. If the operator utilizing the application program 38 creates an image which is stored in video image memory 34 and displayed by the video display 26 and he desires to save that image on the disk 16 for subsequent printing into a hard copy by the printer 22, he may request the computer system 10 to save the bit mapped image data on the disk 16 by depressing the print key to provide the print key request 52. Depressing the print key to provide the print key request 52, in turn, activates the image saving routine 30 to operate in accordance with the functional flow diagram of FIG. 6. The image saving routine 30 first determines whether the basic disk operating system (BDOS) 28 is active as shown in block 100. If it is determined that the basic disk operating system (BDOS) 28 is active, then the image saving request is set as shown in block 102 and return is made to the basic disk operating system (BDOS) 28 as shown in block 104.

Referring now to FIG. 5, there is shown a functional flow diagram for the basic disk operating system (BDOS) stub 54 which also operates in conjunction with the image saving routine 30 to determine at the end of each period in which the basic disk operating system (BDOS) 28 is active whether an image save request was made during the immediately preceding period of basic disk operating system activity. Thus, when the application program 38 interacts with the basic disk operating system (BDOS) 28, the basic disk operating system (BDOS) stub 54 is first activated to call the basic disk operating system (BDOS) 28 as shown in block 202 of the functional flow diagram of FIG. 5. At the end of the basic disk operating system (BDOS) 28 activity, the basic disk operating system (BDOS) stub 54 then operates to clear the BDOS activity as shown in block 204 of the functional flow diagram of FIG. 5. The (BDOS) stub 54 thereafter operates to determine whether an image save request was made during the immediate preceding period of basic disk operating system (BDOS) activity as shown in block 206 of the functional flow diagram of FIG. 5. If it is determined that no command was made in the immediately preceding period of basic disk operating system (BDOS) 28 activity, then the (BDOS) stub 54 returns to the application program 38 as shown in block 208 of the functional flow diagram of FIG. 5. However, if it is determined that an image save request was made by the depression of the print key to provide the print key request 52 as previously discussed during the immediately preceding period of basic disk operating system (BDOS) 28 activity, then the BDOS stub 54 operates to call the image saving routine 30 so as to set in progress the succeeding steps of the image saving functional flow diagram of FIG. 6. Thus, in this manner at the end of each period in which the basic disk operating system (BDOS) 28 is active, there is made a determination whether an image save request was initiated during that period of basic disk operating system (BDOS) 28 activity.

As previously discussed, if an image saving request is made by depressing the print key to provide the print key request 52 during the period when the basic disk operating system (BDOS) 28 is active, then the image saving request is set in accordance with block 102 and the system returns to BDOS 28 activity in accordance with block 104. At the end of the basic disk operating system (BDOS) 28 activity, the determination is then made as to whether an image saving request had been made so as to call the image saving routine 30. The image saving routine thus commences as shown in block 102A of the functional flow diagram of FIG. 6 either immediately in response to the image saving request when it is determined that the basic disk operating system (BDOS) 28 is not active or at the end of the period of basic disk operating system (BDOS) 28 activity when it is determined that the BDOS is active.

Figure 2:
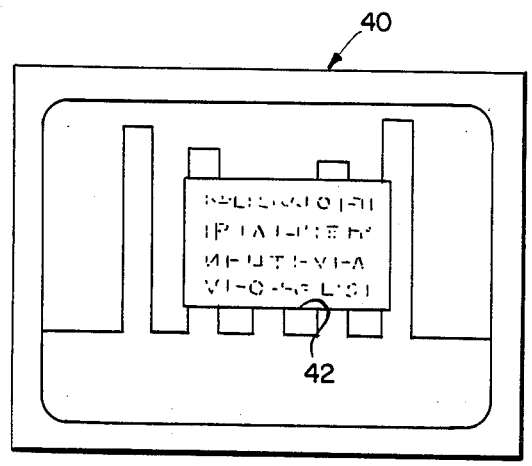
FIG. 2 is a front view of a video display terminal.
Figure 7:
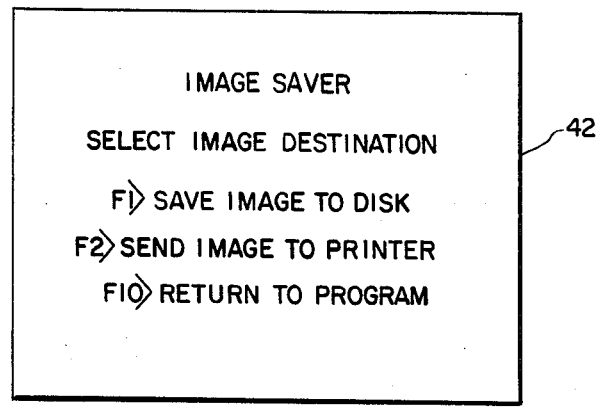
FIG. 7 is a front view showing in greater detail a portion of FIG. 2 in one mode of operation.
Figure 8:
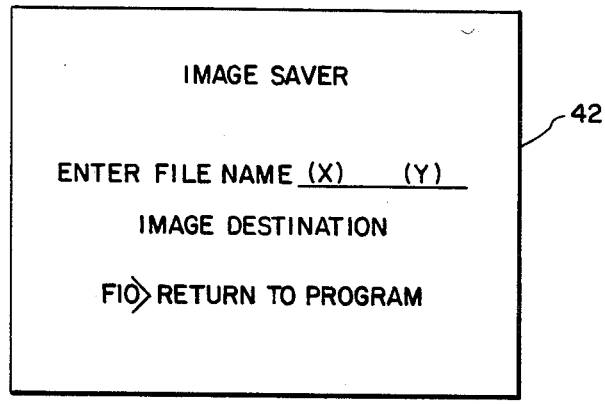
FIG. 8 is a front view showing in greater detail a portion of FIG. 2 in another mode of operation.
Figure 9:
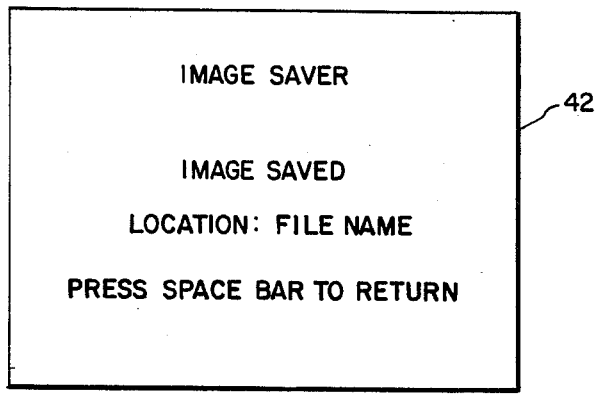
FIG. 9 is a front view showing in greater detail a portion of FIG. 2 in still another mode of operation.

The first function performed by the image saving routine 30 in conjunction with the video stub 56 is to determine what specific CRT display terminal is active when the video display 26 comprises a plurality of different display terminals. The active display terminal of the video display 26 is shown at 40 in FIG. 2, and the next step of the image saving routine 30 as shown in block 104A operates to open a window 42 on a portion of the image displayed by the terminal 40. Referring now to FIG. 7, it can be seen that the image saving routine 30 may next present a menu of questions (block 106, FIG. 6) which are displayed in the window 42 of the display terminal 40 and which may specifically request whether the image is to be saved on the disk 16 or sent immediately to the printer 22 or whether activity should be immediately returned to the applications program 38. Thus, pressing function key F2 will send the image immediately to the printer for printing a hard copy while pressing function key F10 will return the activity to the applications program 38 and no additional questions or messages will be displayed in the window 42 of the display terminal 40. Pressing function key F1, however, will operate to display the messages as shown in FIG. 8 wherein the file name for the image destination is requested. The file name may be selected where X is 40 Column Text Black and White
40 Column Text Color
80 Column Text Black and White
80 Column Text Color
Low Resolution Graphics
High Resolution Graphics and where Y is 32 Color Selection. The aforementioned selections for X and Y are presented by way of example only and are unique to the IBM PC computer, and as is well understood other selections for X and Y would be made for other computers. After typing in the file name, the window 42 is closed (block 108, FIG. 6) and the bit mapped image data is saved on the disk 16 (block 110, FIG. 6). After the bit mapped image data is saved, the window 42 is again opened (block 112, FIG. 6) to report the status of the file (block 114, FIG. 6). The status report is presented as shown in FIG. 9 to confirm that the image has been saved and to provide the file name location of where the image is saved on the disk 16. The image saving routine 30 then awaits for a key to be provided (block 116, FIG. 6) which is accomplished by depressing the space bar on the keyboard 12 as shown in FIG. 9 to close the window 42 (block 118, FIG. 6) and thereby clear the image saving request and return to the applications program 38 (block 120, FIG. 6). Thus, the bit mapped image data is stored by the disk 16 for subsequent recall by the printer 22 to provide a hard copy despite the non-reentrant nature of the basic disk operating system (BDOS) 28. As is readily apparent, the printer 22 is thereafter operated in a well-known manner to retrieve the bit mapped image data from the disk 16 and print a hard copy of the image defined by the bit mapped image data from the disk 16.

Other embodiments of the invention including additions, subtractions, deletions and other modifications of the preferred disclosed embodiments of the invention will be obvious to those skilled in the art and are within the scope of the following claims.

What is claimed is:

1. A method for storing and printing an image utilizing computer graphics apparatus of the type having a non-reentrant operating system comprising the steps of:
   A. requesting the computer graphics apparatus to save bit mapped image data for a selected image on an external data storage medium;
   B. determining whether the operating system is active and holding further action pursuant to said image save request if the operating system is determined to be active;
   C. determining at the end of each period in which the operating system is active whether an image save request was made during that period of operating system activity;
   D. saving said bit mapped image data on the external storage medium either immediately in response to said image save request upon the determination in step B that the operating system is not active or after the termination of operating system activity in response to the determination in step C that said image save request was made during a period of operating system activity; and,
   E. printing the image from said bit mapped image data stored on said external storage medium.

2. The method of claim 1 wherein said operating system is a basic disk operating system.

3. The method of claim 2 wherein said bit mapped image data is saved in step D immediately after the period of basic disk operating system activity during which the image save request of step A is made.

4. The method of claim 3 wherein said computer graphics apparatus includes an image display having more than one display terminal and further including the steps of determining what image display terminal is active.

5. The method of claim 4 further including the steps of opening a window within said active image display terminal, answering a plurality of questions displayed in said window so as to positively designate said image to be saved and thereafter closing said window prior to saving said bit mapped image data in step D.

6. The method of claim 5 further including the step of opening another window within said active image display terminal, reporting the status of the bit mapped image data saved and thereafter closing said other window subsequent to saving said bit mapped image data in step D.

* * * * *